(12) United States Patent
Carrara et al.

(10) Patent No.: US 12,084,017 B2
(45) Date of Patent: Sep. 10, 2024

(54) ELECTRO-HYDRAULIC ACTUATOR FOR BRAKE

(71) Applicant: FRENI BREMBO S.P.A., Curno (IT)

(72) Inventors: Marco Carrara, Curno (IT); Paolo Sala, Curno (IT)

(73) Assignee: Brembo S.p.A., Bergamo (IT)

( * ) Notice: Subject to any disclaimer, the term of this patent is extended or adjusted under 35 U.S.C. 154(b) by 939 days.

(21) Appl. No.: 17/059,695

(22) PCT Filed: May 24, 2019

(86) PCT No.: PCT/IB2019/054324
§ 371 (c)(1),
(2) Date: Nov. 30, 2020

(87) PCT Pub. No.: WO2019/229604
PCT Pub. Date: Dec. 5, 2019

(65) Prior Publication Data
US 2021/0197782 A1    Jul. 1, 2021

(30) Foreign Application Priority Data

May 31, 2018   (IT) .................. 102018000005888

(51) Int. Cl.
*B60T 13/74*    (2006.01)
*F16H 1/46*    (2006.01)
(Continued)

(52) U.S. Cl.
CPC ............ *B60T 13/745* (2013.01); *F16H 55/06* (2013.01); *F16H 57/02* (2013.01); *F16H 1/46* (2013.01);
(Continued)

(58) Field of Classification Search
CPC ........ B60T 13/745; F16H 55/06; F16H 57/02; F16H 1/46; F16H 2055/176; F16H 2057/02034; F16H 2057/02082
See application file for complete search history.

(56) References Cited

U.S. PATENT DOCUMENTS 4,016,779 A * 4/1977 Von Greyerz .......... F16H 47/06
74/724
6,053,289 A * 4/2000 Bauer ................... F16D 65/567
188/71.9
(Continued)

FOREIGN PATENT DOCUMENTS

DE    102011102860 A1    12/2012
EP       1021664 B1     1/2002
(Continued)

OTHER PUBLICATIONS

European Patent Office, International Search Report with Written Opinion, issued in PCT/IB2019/054324, Jul. 8, 2019, 11 pages, European Patent Office, Rijswijk, Netherlands.

*Primary Examiner* — Bradley T King
*Assistant Examiner* — James K Hsiao
(74) *Attorney, Agent, or Firm* — Marshall & Melhorn, LLC

(57) ABSTRACT

An electro-hydraulic actuator for actuating a brake caliper may have an electric motor with a drive shaft, a transforming mechanism and a first housing to accommodate the transforming mechanism and support a second housing of the electric motor. The transforming mechanism may include a reduction gear to demultiply the rotary motion of the drive shaft. The reduction gear may have a crown with inner toothing in one piece and that is rotationally locked. The crown may have a front portion directly shape-coupled to and inserted in the second housing of the electric motor and a connection integral with the first housing of the transform- (Continued)

ing mechanism for a precise centering between the electric motor and the reduction gear with respect to the axis of the drive shaft and with respect to a central axis of the reduction gear.

12 Claims, 4 Drawing Sheets

(51) Int. Cl.
 *F16H 55/06* (2006.01)
 *F16H 57/02* (2012.01)
 *F16H 55/17* (2006.01)
(52) U.S. Cl.
 CPC .............. *F16H 2055/176* (2013.01); *F16H 2057/02034* (2013.01); *F16H 2057/02082* (2013.01)

(56) References Cited

U.S. PATENT DOCUMENTS

| | | | | |
|---|---|---|---|---|
| 6,666,308 B1* | 12/2003 | De Vries | ................ | F16H 25/20 |
| | | | | 188/72.1 |
| 7,721,853 B2* | 5/2010 | Chittka | ................ | F16D 65/18 |
| | | | | 188/162 |
| 7,854,995 B1* | 12/2010 | Anderson | ................ | B23P 15/14 |
| | | | | 428/546 |
| 9,340,194 B2 | 5/2016 | Giering | | |
| 9,856,935 B2* | 1/2018 | Arrigoni | ................ | F16D 65/14 |
| 10,830,311 B2* | 11/2020 | Koop | ................ | F16H 55/06 |
| 11,287,002 B1* | 3/2022 | Kong | ................ | F16D 65/16 |
| 2009/0107275 A1* | 4/2009 | Cooper | ................ | F16H 55/06 |
| | | | | 74/462 |
| 2012/0325601 A1* | 12/2012 | Giering | ................ | F16D 65/18 |
| | | | | 188/162 |
| 2014/0166413 A1* | 6/2014 | Giering | ................ | B60T 13/746 |
| | | | | 188/156 |
| 2015/0210253 A1* | 7/2015 | Qi | ................ | B60T 7/085 |
| | | | | 188/162 |
| 2015/0219191 A1* | 8/2015 | Gaffe | ................ | F16H 19/04 |
| | | | | 74/89.17 |
| 2016/0297469 A1* | 10/2016 | Galehr | ................ | B62D 5/0454 |
| 2016/0339890 A1* | 11/2016 | Cann | ................ | B60T 13/745 |
| 2019/0072163 A1* | 3/2019 | Matsuto | ................ | H02K 7/116 |
| 2019/0107184 A1* | 4/2019 | Matsuto | ................ | F16H 57/02 |
| 2019/0154118 A1* | 5/2019 | Koop | ................ | F16H 55/0853 |

FOREIGN PATENT DOCUMENTS

| | | |
|---|---|---|
| EP | 2395262 B1 | 4/2013 |
| IT | 0001411578 | 11/2013 |
| JP | S63214546 A | 9/1988 |
| JP | H0348048 A | 3/1991 |
| WO | 99/21266 A1 | 4/1999 |
| WO | 2013/121358 A1 | 8/2013 |
| WO | 2013/168122 A2 | 11/2013 |

* cited by examiner

ELECTRO-HYDRAULIC ACTUATOR FOR BRAKE

FIELD OF APPLICATION

The present invention relates to an electro-hydraulic actuator for actuating a brake caliper, in particular for a disc brake, for cars, motorcycles, commercial and industrial vehicles in general, which includes a speed reduction gear.

PRIOR ART

Braking systems for cars of the BBW (Brake By Wire) type are known and widely used in which a linear transducer connected to a brake pedal is configured to detect the stroke of the brake pedal and to transmit an electric signal, indicative of the user's request for braking torque, to a control unit. Such a control unit processes the transducer signal and controls an electric motor of a hydraulic pump as a function of the braking torque request. The hydraulic pump operated by electric motor pressurizes and conveys a hydraulic fluid to the hydraulic pressure assemblies of the vehicle brakes.

With respect to the traditional braking systems in which the pedal brake acts directly on the hydraulic circuit, the advantage of Brake By Wire systems is in being able to generate and control the hydraulic pressure of the braking system without the aid of the force applied by the brake pedal. Additionally, the at least partial replacement of hydraulic circuits by electric circuits allows a saving of hydraulic fluid, a reduction of weight and a reduction of the environmental impact of the entire braking system.

A solution of an electro-hydraulic actuator for a hydraulic brake of known type is described in the Applicant's patent n. IT 1411578. The electro-hydraulic actuator described herein comprises an electric motor with a drive shaft and a transforming mechanism connected to the drive shaft to transform a rotary motion of the drive shaft into a translational motion of a movable portion configured to act on the hydraulic pump.

In greater detail, an actuator housing is configured to accommodate the transforming mechanism and to support the electric motor.

Such a known actuator has a double centering: a first centering between the electric motor and the transforming mechanism housing and a second centering between the same housing and a crown with inner toothing associated with the epicyclic reduction gear, in particular two-stage, included in the transforming mechanism.

Such a double centering suggested in the known solution displays evident constructional limitations in the making of the actuator dictated by large dimensions, loss of efficiency due to the greater required tolerances and assembly complexity of the actuator components themselves.

SUMMARY OF THE INVENTION

It is thus the object of the present invention to make available an electro-hydraulic actuator for actuating a brake caliper having features such as to avoid the drawbacks mentioned with reference to the prior art.

In particular, the present invention relates to an electro-hydraulic actuator for actuating a brake caliper, in particular a disc brake of a vehicle with two or more wheels, which comprises:
- an electric motor with a drive shaft;
- a transforming mechanism connected to the drive shaft to transform a rotary motion of the drive shaft into a translational motion of a translatable portion configured to act on a hydraulic master cylinder of the brake;
- a first housing configured to accommodate the transforming mechanism and support a second housing of the electric motor, wherein said transforming mechanism includes a reduction gear configured to demultiply the rotary motion of the drive shaft; said reduction gear comprises a crown with inner toothing in one piece and rotationally locked.

The crown with inner toothing comprises a front portion directly shape-coupled to and inserted in the second housing of the electric motor and a connection integral with the first housing of the transforming mechanism so as to achieve a precise centering between the electric motor and the reduction gear with respect to the axis of the drive shaft and with respect to a central axis of the reduction gear.

The coupling between the outer circumferential surface of the ring and the housing of the transforming mechanism is preferably of the type with an interference.

This type of coupling guarantees the centering between ring gear and housing of the transmission mechanism and the correct assembly of the O-ring between the electric motor housing and the transmission mechanism housing.

The coupling between the crown with inner toothing and the electric motor housing and the integral connection of the crown itself with the first housing of the transforming mechanism ensures that such a crown acts as an axial guide to ensure the correct timing of the electric motor pinion with respect to the planet gears of the first stage of the crown gear, i.e. to ensure the correct assembly of the electric motor with respect to the centering. In other words, the steps of assembling of actuator components are simplified with respect to the known solutions.

It is another object of the invention to provide an electro-hydraulic actuator in which the crown with inner toothing of the reduction gear comprises means for preventing the rotation of the crown with respect to the first housing of the transforming mechanism and/or with respect to the second housing of the electric motor.

It is a further object of the invention to provide an electro-hydraulic actuator in which the crown with inner toothing of the reduction gear can be made of a material different from that of the housing of the transforming mechanism, e.g. of a thermoplastic polymeric material. This has the advantage of reducing the overall weight and the manufacturing cost of the actuator.

These and other objects are achieved by an electro-hydraulic actuator for actuating a brake caliper according to claim 1.

Some preferred and advantageous embodiments of such an electro-hydraulic actuator are the object of the dependent claims.

BRIEF DESCRIPTION OF THE DRAWINGS

Further features and advantages of the electro-hydraulic actuator for actuating a brake caliper according to the invention will be apparent from the description of preferred embodiments, given by way of indicative, non-limiting example, with reference to the accompanying figures, in which.

Similar or equivalent elements in the aforesaid figures will be indicated by means of the same reference numerals.

DETAILED DESCRIPTION

Figure 1A:
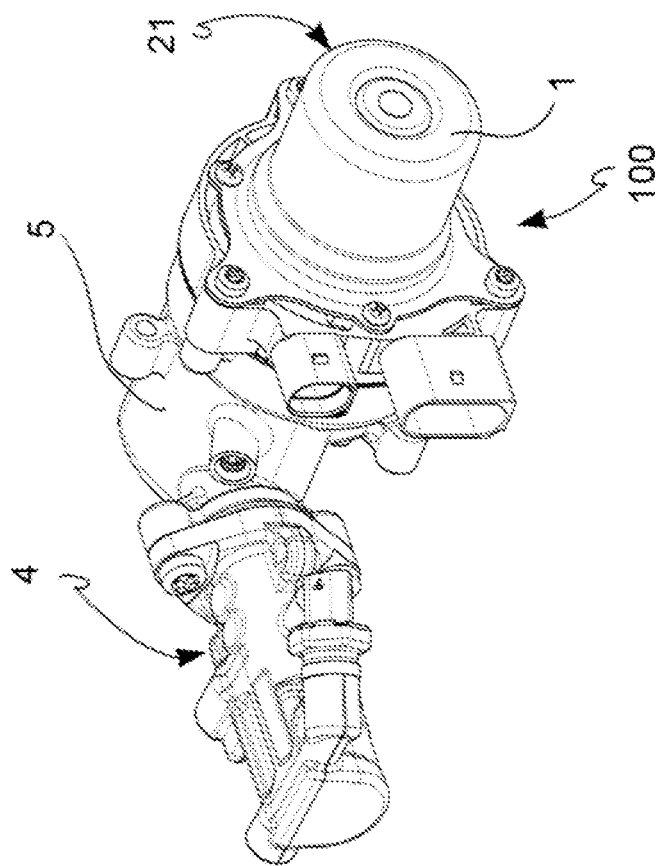
FIGS. 1A-1B are perspective views of an electro-hydraulic actuator for hydraulic brakes according to the invention.
Figure 1B:
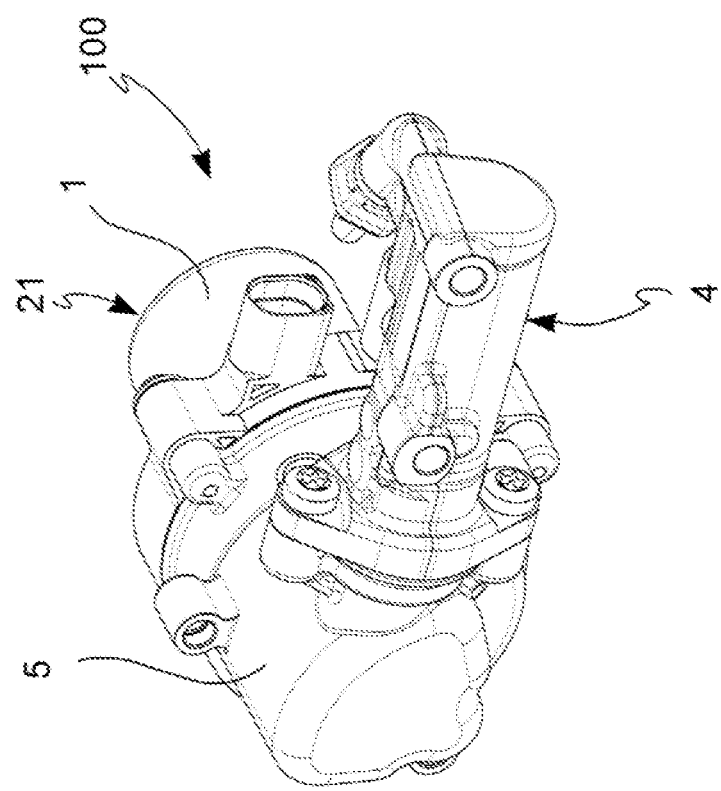

An electro-hydraulic actuator according to the invention is shown in the figures and indicated by reference numeral 100 as a whole.

Such an electro-hydraulic actuator 100, or simply actuator, is configured for actuating a brake caliper of the disc brake with a hydraulic thrust assembly. The actuator 100 comprises an electric motor 1 with a drive shaft 2, a transforming mechanism 3 connected to the drive shaft 2 and adapted to transform a rotary motion of the motor shaft 2 into a translational motion of a movable portion of the actuator housed in a portion 4 of the actuator 100 which extends from the actuator 100 orthogonally to the drive shaft 2.

In particular, a hydraulic pump (not shown in the figures) is operatively associated with the motion transforming mechanism 3 to perform an increase in the hydraulic fluid pressure in response to said translational movement.

With reference to FIGS. 1A, 1B, 2, 5, the actuator 100 comprises a first housing 5 configured to accommodate the transforming mechanism 3 and to support a second housing 21 of the electric motor 1.

Figure 2:
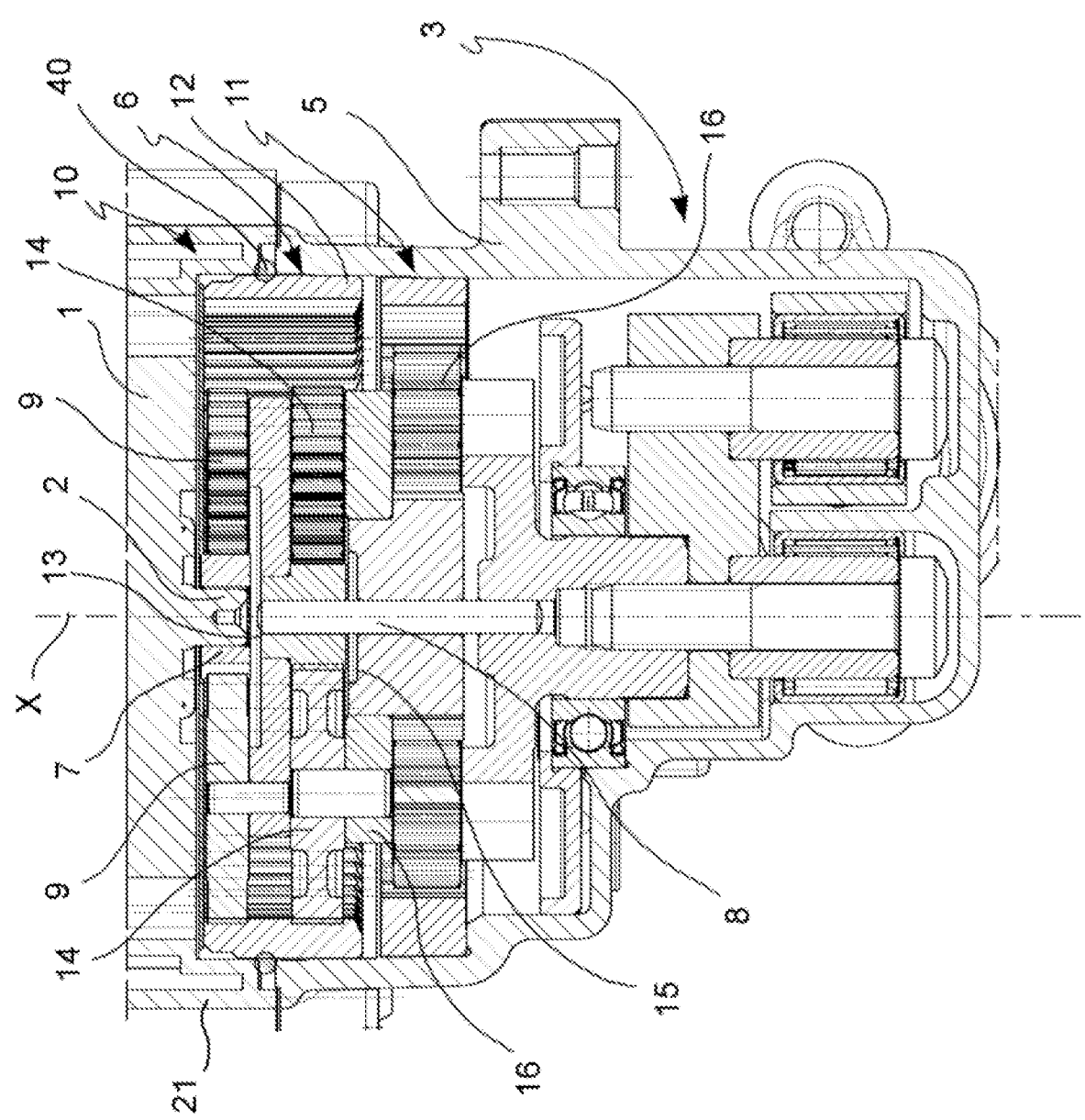
FIG. 2 is a section view taken along a longitudinal axis and enlarged of a portion of the actuator in FIGS. 1A-1B according to a first embodiment of the invention.
Figure 5:
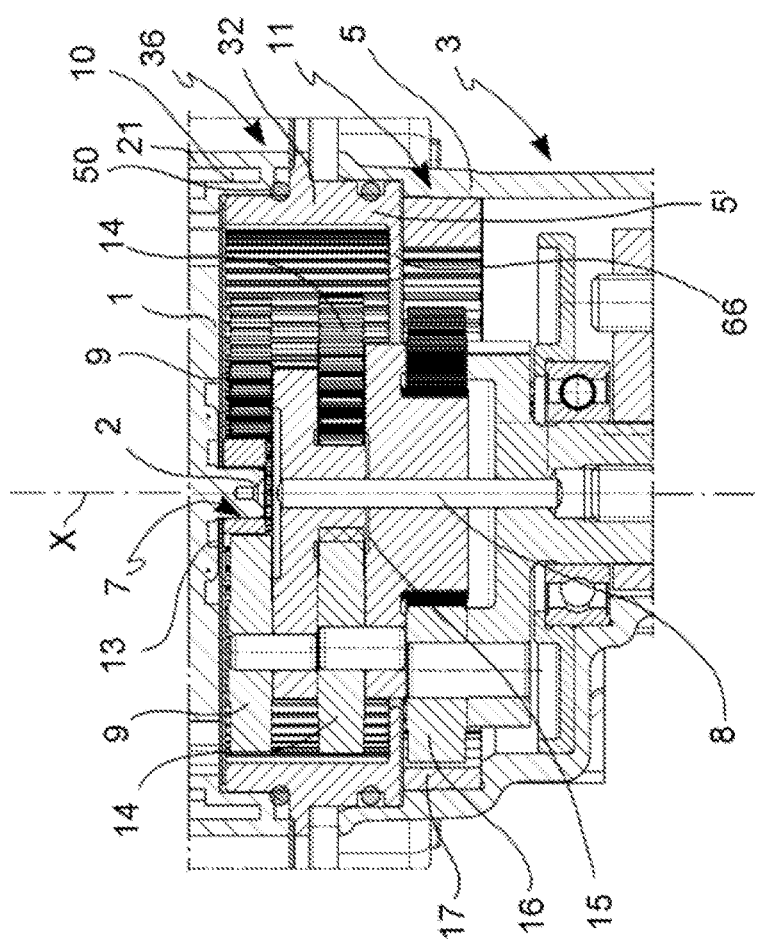
FIG. 5 is a section view taken along a longitudinal axis and enlarged of a portion of the actuator of the invention according to a second embodiment.

With reference to the embodiments in FIGS. 2 and 5, in greater detail, the transforming mechanism 3 includes a motion reduction gear 6, 36 configured to demultiply the rotary motion of the drive shaft 2 and a transforming assembly to convert the rotary motion into a translational motion.

Such a reduction gear 6, 36 comprises a crown 12, 32 with inner toothing in a single piece and locked in rotation.

In an example of embodiment, the reduction gear 6, 36 is epicyclic and comprises a first reduction portion 10 operatively associated with the crown 12, 32 with inner toothing. In particular, the aforesaid first reduction portion 10 includes a first and a second reduction stage.

Furthermore, the epicyclic reduction gear 6; 36 comprises a second reduction portion 11, which includes a third reduction stage.

It is worth noting that the transforming mechanism 3 comprises transmission means 7 of the rotary motion of the drive shaft 2 to the epicyclic reduction gear 6, 36.

According to an embodiment of the invention, said transmission means 7 comprise a connecting portion formed on the end of the motor shaft 2 having an external toothing which meshes planet gears 9 of a first set of planet gears of the epicyclic reduction gear 6, 36 so that the drive shaft 2 forms the central pinion of a first stage of the first reduction portion 10 of the epicyclic reducer 6, 36.

The first reduction portion 10, which comprises the first reduction stage, includes the aforesaid central pinion formed by the end of the drive shaft 2, the first set of planet gears 9 supported by a first planet carrier plate 13 and the crown 12, with internal toothing locked in rotation in which the aforesaid planet gears 9 mesh both the drive shaft 2 and the crown 12, 32.

The aforesaid first planet carrier plate 13 comprises, in turn, a central toothed portion which constitutes a central pinion (sun gear) of a second reduction stage of the first reduction portion 10.

Such a second reduction stage comprises, in addition to the second central pinion (sun gear) formed by the central toothed portion of the first planet carrier plate 13, the toothed crown 12, 32 itself and a second set of planet gears 14 which mesh with both the second central pinion and the crown 12, 32 with inner toothing.

Such second planet gears 14 are supported by a second planet carrier plate 15 which forms the connection to the second reduction portion 11.

As shown in FIGS. 2 and 5, the reduction gear 6, 36 comprises a central pin 8 configured to improve the functionality of the discs of the first and of the second stage of the first reduction portion 10.

The second reduction portion 11 includes, for example, the third reduction stage similar to the aforesaid first and second reduction stage and includes a third set of planet gears 16 which mesh with a respective central pinion of the planet carrier plate 15 and a further crown 17.

As known to a person skilled in the art, two different sets of toothing are used as a function of the loads in the reduction gear 6, 36 which comprises three epicyclic planetary reduction stages.

According to an advantageous example of the present invention, the crown 12, 32 with inner toothing comprises a front portion 42, 62 directly shape-coupled to and inserted in the second housing 21 of the electric motor 1 and a rigid connection with the first housing 5 of the transforming mechanism 3.

In such a manner, the rotation axis of the electric motor coincides with the central rotation axis X of the reduction gear 6, 36 whereby making a precise centering between the electric motor and the reduction gear.

With reference to FIG. 2, 3, 4, in a first example embodiment of the invention, the aforesaid integral connection is directly shape-coupled to and inserted between a rear portion 43 of the crown 12 with inner toothing of the reduction gear 6 and the first housing 5 of the transforming mechanism 3.

In a particular embodiment, such a crown 12 with inner toothing is made of steel. The number of teeth is, for example, comprised in the range from seventy to ninety teeth.

Figure 6:
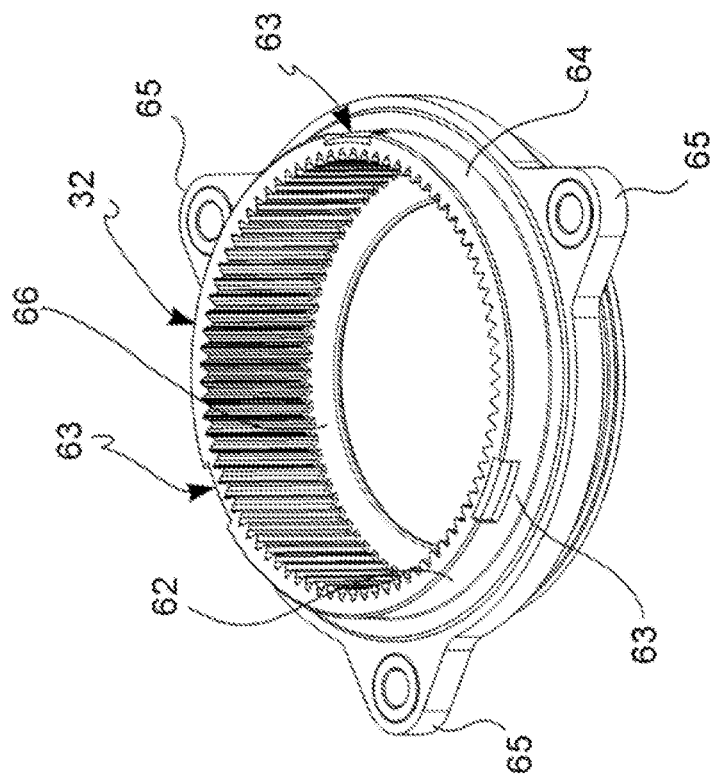
FIG. 6 is a perspective view of a crown with inner toothing of the reduction gear of FIG. 5 according to the second example of embodiment of the invention.

With reference to FIGS. 5, 6, in a second example embodiment of the invention, the aforesaid integral connection is made by continuity of material, wherein the crown 32 with inner toothing and the first housing 5, 5' are in one piece.

In particular, the crown 32 is in one piece with a portion 5' of the first housing 5 of the transforming mechanism 3.

With reference to FIG. 6, such a crown 32 with inner toothing comprises respective fastening seats 65, in particular at least three seats, having radial development configured to be engaged by respective screws for fixing the crown 32 to the first housing 5 of the transforming mechanism.

Furthermore, the crown 32 comprises a circular crown wall 66 which develops orthogonally to the main longitudinal axis of the crown 32 configured to separate the first reduction portion 10 from the second reduction portion 11.

In a particular embodiment, the crown 32 with internal toothing of the gear reducer 36 is made of thermoplastic polymeric material. The number of teeth is, for example, comprised in the range from seventy to ninety teeth.

In an example embodiment of the actuator of the invention, the crown 12, 32 with inner toothing comprises means 44, 65 adapted to prevent the rotation of the crown 12, 32 with respect to the first housing 5 of the transforming mechanism 3 and/or with respect to the second housing 21 of the electric motor 1.

Figure 4:
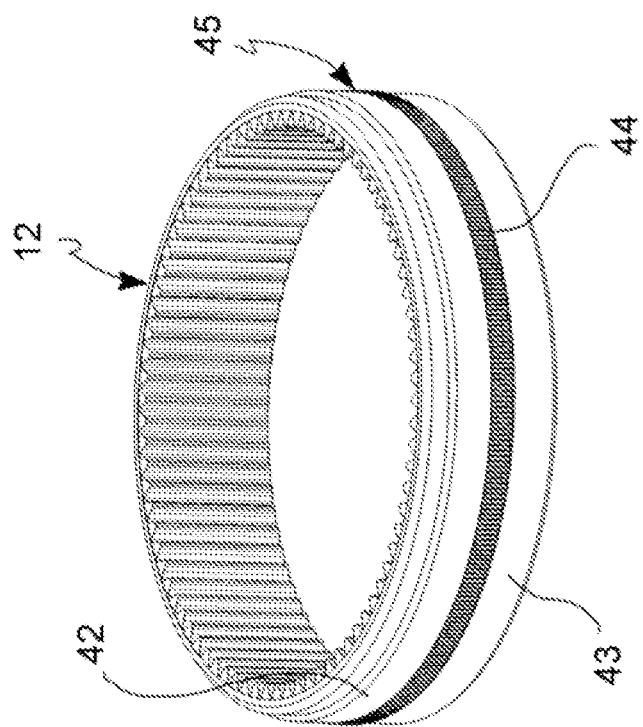
FIG. 4 is a perspective view of a crown with inner toothing of the reduction gear of FIGS. 2 and 3 according to the first embodiment.
Figure 3:
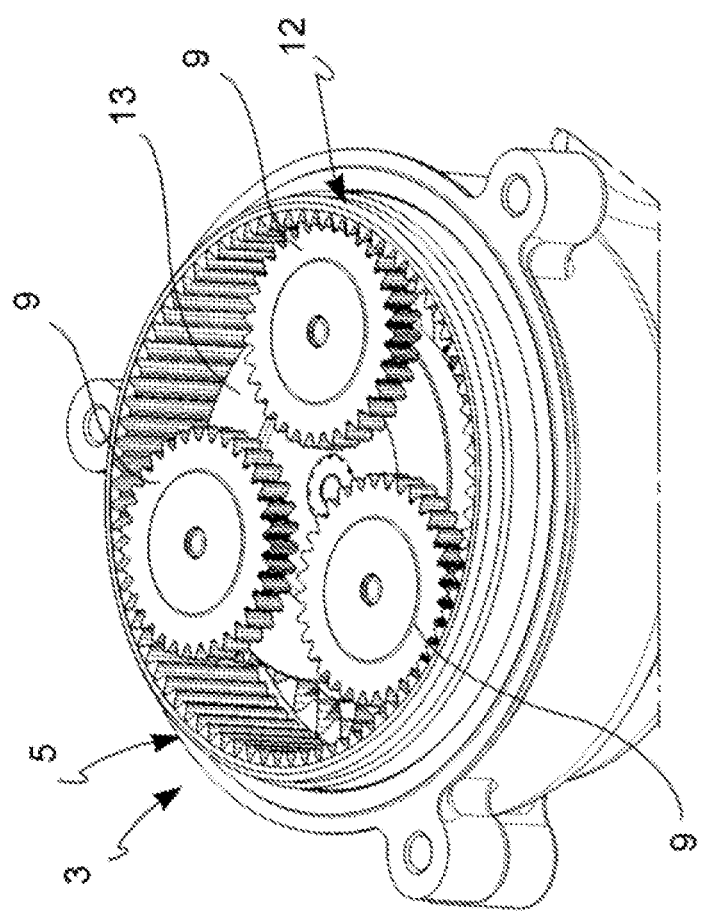
FIG. 3 is a perspective view of a portion of a reduction gear of the actuator in FIG. 2.

With reference to FIG. 4, in a first example of the invention, the aforesaid means for preventing the rotation of the crown 12 with inner toothing comprise a knurled band 44 provided on an outer circumferential surface 45 of the crown adapted to interfere with the first housing 5 of the transforming mechanism 3.

With reference to FIG. 6, in a second example of the invention, the aforesaid means for preventing the rotation of the crown 32 with inner toothing comprise the aforementioned at least three fixing seats 65 protruding from a circumferential external surface 64 of the crown 32.

In a particularly advantageous example embodiment, the crown 32 with internal toothing of the reduction gear 36 comprises at least three recesses 63, in the example equally spaced apart from one another by 120°, along an edge of the front portion 62 of the crown. Such recesses 63 are configured to promote the centering of motor shim (not shown in the figures) with the second housing 21 of electric motor 1.

It is worth noting that the circular crown wall 66 which extends at right angles to the main longitudinal axis of the crown 32 is opposed to the aforesaid front portion edge 62 of the crown.

The present invention also relates to the single brake that comprises the electro-hydraulic actuator 100 for powering the hydraulic thrust assembly.

It is worth noting that the outer part of the crown 12 of the actuator 100 of the invention ensures the centering towards the housing 5 of the transmission ensuring the interference and also the correct mounting of O-rings 40, 50 between the transmission housing 3 and the engine housing.

Moreover, the crown with inner toothing 12, 32 is configured to provide an axial guide sufficient for the correct installation of the motor 1 with respect to the centering. In the step of inserting, such a configuration guarantees the timing of the pinion (motor) with respect to the planet gears 9 of the first stage of the first reduction portion 10.

Each of the individual features described by way of example in combination with other features are to be understood as also described in independent and isolated manner and therefore also applicable to the other described embodiments of the electro-hydraulic actuator for brake according to the invention.

These embodiments with features either in isolation or in combination with the features of other embodiments are expressly contemplated but not described herein for the sake of brevity.

The invention claimed is:

1. An electro-hydraulic actuator for actuating a brake caliper, in particular a disc brake of a vehicle with two or more wheels, comprising:
   an electric motor with a drive shaft;
   a transforming mechanism connected to the drive shaft to transform a rotary motion of the drive shaft into a translational motion of a translatable portion configured to act on a hydraulic master cylinder of said brake;
   a first housing configured to accommodate the transforming mechanism and support a second housing of the electric motor, said transforming mechanism including a reduction gear configured to demultiply the rotary motion of the drive shaft, said reduction gear comprising a crown with inner toothing in one piece and rotationally locked,
wherein
said crown with inner toothing comprises a front portion directly shape-coupled to and inserted in the second housing of the electric motor and a connection integral with the first housing of the transforming mechanism so as to achieve a precise centering between the electric motor and the reduction gear with respect to the axis of the drive shaft and with respect to a central axis of the reduction gear.

2. The electro-hydraulic actuator according to claim 1, wherein said integral connection is directly shape-coupled to and inserted between a rear portion of the crown with inner toothing and the first housing of the transforming mechanism.

3. The electro-hydraulic actuator according to claim 2, wherein said crown with inner toothing is made of steel.

4. The electro-hydraulic actuator according to claim 3, wherein said crown with inner toothing is made of thermoplastic polymer material.

5. The electro-hydraulic actuator according to claim 1, wherein said integral connection is made by continuity of material wherein the crown with inner toothing and the first housing are in one piece.

6. The electro-hydraulic actuator according to claim 1, wherein said crown with inner toothing comprises means adapted to prevent the rotation of the crown with respect to the first housing of the transforming mechanism and/or with respect to the second housing of the electric motor.

7. The electro-hydraulic actuator according to claim 6, wherein said means for preventing the rotation of the crown with inner toothing comprise a knurled band provided on an outer circumferential surface of the crown adapted to interfere with the first housing of the transforming mechanism.

8. The electro-hydraulic actuator according to claim 6, wherein said means for preventing the rotation of the crown with inner toothing comprise at least three fastening seats protruding from an outer circumferential surface of the crown, said fastening seats being configured to be engaged by respective screws for fixing the crown with inner toothing to the first housing of the transforming mechanism.

9. The electro-hydraulic actuator according to claim 1, wherein said crown with inner toothing comprises at least three recesses provided along an edge of the front portion of the crown.

10. The electro-hydraulic actuator according to claim 1, wherein said reduction gear is epicyclic and comprises a first reduction portion, which includes a first and a second reduction stage, operatively associated with said crown with inner toothing.

11. The electro-hydraulic actuator according to claim 10, wherein said epicyclic reduction gear comprises a second reduction portion, which includes a third reduction stage.

12. The hydraulic brake for a vehicle, comprising a hydraulic thrust unit and an electro-hydraulic actuator according to claim 1.

* * * * *